United States Patent
Volftsun et al.

(10) Patent No.: US 11,613,455 B1
(45) Date of Patent: Mar. 28, 2023

(54) AUTOMATED VENTING OF GAS/FOAM FROM FOAM ON BEER DETECTOR FOR CARBONATED BEVERAGES

(71) Applicant: Sestra Systems, Inc., Sterling, VA (US)

(72) Inventors: Lev Volftsun, Sterling, VA (US); Alex Kushnir, Sterling, VA (US); Thomas AuBuchon, Sterling, VA (US)

(73) Assignee: SESTRA SYSTEMS, INC., Sterling, VA (US)

( * ) Notice: Subject to any disclaimer, the term of this patent is extended or adjusted under 35 U.S.C. 154(b) by 0 days.

(21) Appl. No.: 17/463,218

(22) Filed: Aug. 31, 2021

Related U.S. Application Data

(60) Continuation-in-part of application No. 17/458,776, filed on Aug. 27, 2021, and a continuation-in-part of application No. 17/097,297, filed on Nov. 13, 2020, and a continuation-in-part of application No. 17/084,434, filed on Oct. 29, 2020, and a continuation-in-part of application No. 17/072,448, filed on Oct. 16, 2020, now Pat. No. 11,161,730, and a continuation-in-part of application No. 16/933,147, filed on Jul. 20, 2020, and a continuation-in-part of application No. 16/503,681, filed on Jul. 5, 2019, now Pat. No. 11,161,729, said application No. 17/458,776 is a division of application No. 16/503,681, filed on Jul. 5, 2019, now Pat. No. 11,161,729, which is a continuation-in-part of application No. 15/869,028,
(Continued)

(51) Int. Cl.
*B67D 1/08* (2006.01)
*G01F 23/30* (2006.01)
*B67D 1/12* (2006.01)
*B67D 1/00* (2006.01)

(52) U.S. Cl.
CPC ......... *B67D 1/0878* (2013.01); *B67D 1/0004* (2013.01); *B67D 1/0888* (2013.01); *B67D 1/1272* (2013.01); *G01F 23/30* (2013.01); *B67D 2001/1261* (2013.01); *Y10T 137/7358* (2015.04)

(58) Field of Classification Search
CPC .. B67D 1/0878; B67D 1/0004; B67D 1/0888; B67D 1/1272; B67D 2001/1261; G01F 23/30; Y10T 137/7358
USPC .......................................................... 222/52
See application file for complete search history.

(56) References Cited

U.S. PATENT DOCUMENTS 5,349,993 A * 9/1994 Casey ................. B67D 1/1405
141/141
5,988,859 A * 11/1999 Kirk ........................ B67D 1/06
700/242

(Continued)

*Primary Examiner* — Patrick M. Buechner
*Assistant Examiner* — Michael J. Melaragno
(74) *Attorney, Agent, or Firm* — Gugliotta & Gugliotta, LPA

(57) ABSTRACT

An automated system for venting gas from a FOB is provided replacing a conventional manual venting button at the top of a FOB with a remotely controlled vent (bleed) valve attached to the FOB. After that the venting button is reinstalled in parallel with the vent valve. The automated vent valve can be implemented as a solenoid or pneumatic valve and is controlled by a controller. A tube connects FOB's vent outlet with a waste bucket. When the FOB is vented, a mix of gas, foam, and beverage is expelled from the FOB chamber and deposited in this waste bucket.

12 Claims, 4 Drawing Sheets

Related U.S. Application Data filed on Jan. 11, 2018, now Pat. No. 10,294,093, and a continuation-in-part of application No. 15/487,488, filed on Apr. 14, 2017, now Pat. No. 9,926,181, and a continuation-in-part of application No. 15/424,478, filed on Feb. 3, 2017, now Pat. No. 10,167,183, and a continuation-in-part of application No. 15/332,117, filed on Oct. 24, 2016, now Pat. No. 10,294,092, and a continuation-in-part of application No. 14/686,820, filed on Apr. 15, 2015, now Pat. No. 10,125,002.

(60) Provisional application No. 63/029,585, filed on May 25, 2020, provisional application No. 62/961,919, filed on Jan. 16, 2020, provisional application No. 62/695,213, filed on Jul. 9, 2018.

(56) References Cited

U.S. PATENT DOCUMENTS

| | | | | |
|---|---|---|---|---|
| 6,082,389 A * | | 7/2000 | Latham | B67D 1/1247 137/181 |
| 7,040,359 B2 * | | 5/2006 | Younkle | F16K 1/12 222/321.6 |
| 9,926,181 B1 * | | 3/2018 | Volftsun | B67D 1/0082 |
| 10,125,002 B2 * | | 11/2018 | Volftsun | B67D 7/08 |
| 10,167,183 B1 * | | 1/2019 | Volftsun | B67D 1/12 |
| 10,252,900 B2 * | | 4/2019 | Cook | B67D 1/0864 |
| 10,294,092 B2 * | | 5/2019 | Volftsun | B67D 1/00 |
| 10,294,093 B1 * | | 5/2019 | Volftsun | B67D 1/0884 |
| 10,752,481 B2 * | | 8/2020 | Cook | B67D 1/0075 |
| 11,124,406 B1 * | | 9/2021 | Volftsun | B67D 1/1234 |
| 11,161,729 B2 * | | 11/2021 | Volftsun | B67D 1/0878 |
| 11,161,730 B1 * | | 11/2021 | Volftsun | B67D 1/0007 |
| 11,203,515 B2 * | | 12/2021 | Cook | B67D 1/0075 |
| 11,225,406 B2 * | | 1/2022 | Briant | B67D 1/0003 |
| 11,378,433 B2 * | | 7/2022 | Volftsun | B67D 1/103 |
| 2002/0088823 A1 * | | 7/2002 | Tabacchi | B67D 1/1234 222/52 |
| 2008/0142115 A1 * | | 6/2008 | Vogt | B67D 1/124 141/374 |
| 2009/0159612 A1 * | | 6/2009 | Beavis | A47J 31/40 222/145.5 |
| 2011/0289947 A1 * | | 12/2011 | Chadwell | F25D 31/002 700/282 |
| 2016/0297665 A1 * | | 10/2016 | Petermann | B67D 1/1422 |
| 2017/0233238 A1 * | | 8/2017 | Bryant | B67D 1/1252 62/126 |
| 2018/0155176 A1 * | | 6/2018 | Cook | B67D 1/10 |
| 2019/0322518 A1 * | | 10/2019 | Bond | B67D 1/1247 |
| 2020/0055720 A1 * | | 2/2020 | Volftsun | G01F 23/0007 |
| 2020/0122995 A1 * | | 4/2020 | Chernov | G01S 7/481 |
| 2020/0346915 A1 * | | 11/2020 | Cook | B67D 1/0864 |
| 2021/0047169 A1 * | | 2/2021 | Volftsun | B67D 1/1477 |
| 2022/0204333 A1 * | | 6/2022 | McCann | B67D 1/0837 |

\* cited by examiner

RELATED APPLICATION

AUTOMATED VENTING OF GAS/FOAM FROM FOAM ON BEER DETECTOR FOR CARBONATED BEVERAGES

RELATED APPLICATIONS

The present invention is a Continuation in Part of U.S. Ser. No. 16/503,681, filed on Jul. 5, 2019. Additional applications of related continuity are further disclosed as part of the Application Data Sheet filed pursuant to 37 C.F.R. § 1.76. All Related Applications and applications of related continuity are incorporated by reference as if fully rewritten herein.

BACKGROUND OF THE INVENTION

1. Field of the Invention

The present invention relates generally to an improved operation of the Beverage Dispensing System of the type described, taught or anticipated by or within the Related Applications or their equivalents and, more particularly, to a system and method automating the venting of gas and/or foam from a Foam on Beer (FOB) detector used as part of such a beverage dispensing system.

2. Description of the Related Art

In the automated beverage dispensing systems of the Related Applications, bulk alcoholic beverages such as wine have been successfully dispensed in a manner that meters, tracks, controls and continuously dispenses in a faster and more accurate manner. Such systems prevent oxidation of the beverage contents while allowing for necessary and routine delivery line cleaning through several mechanism.

Currently in use with conventional draught beer delivery systems are Foam On Beer (FOB) detectors. Such FOB devices generally utilize a radially expanded chamber within a beer delivery that is fitted with a float valve. In such a configuration when the float valve chamber is full of beer, the float valve floats in the liquid, thereby leaving the beer valve open and supplying beer to the taps. However, when foam or froth begins to develop in the chamber, the float valve is too heavy and will not float on the froth. It will consequently sink down to the beer outlet, closing it off and preventing the foam from entering the supply lines.

While such systems can and have been adapted for use with carbonated alcoholic beverages such as beer, sparkling wine or mixed cocktails, it has been found that a significant problem occurs prior to and during a changeover of a bulk beverage keg. As a keg becomes empty if the system pressure is allowed to drop in the line connecting the FOB and the tap such that the carbon dioxide gas will no longer remain within solution, resulting in a flat beverage. Further, if the system pressure is not maintained throughout the process, the connection of a new, full and high pressure keg will result in the first fluid into the system becoming excessively foamy.

Consequently, a need still exists to maintain the system pressure throughout the process of connecting of a new, full and high pressure keg. As such, a system and method for identifying the movement of the float of a Foam On Beer detector and controlling of dispensing of carbonated beverages based on the identifying the movement of the float would be advantageous.

SUMMARY OF THE INVENTION

It is thus an object of the present invention to provide a system and method for detecting an empty keg in a manner that anticipates keg changeover.

It is a further object of the present invention to provide to provide a system and method for automating the venting of gas and/or foam from an FOB within the system.

Briefly described according to the present invention, an automated system for venting gas from a FOB is provided. The conventional venting button at the top of a FOB is removed and replaced with a remotely controlled vent (bleed) valve attached to the FOB. After that the venting button is reinstalled in parallel with the vent valve. The automated vent valve can be implemented as a solenoid or pneumatic valve and is controlled by a controller. A tube connects FOB's vent outlet with a waste bucket. When the FOB is vented, a mix of gas, foam, and beverage is expelled from the FOB chamber and deposited in this waste bucket.

It is an advantage of the present invention to incorporate an automated remotely controlled valve for venting of FOB's.

It is another advantage of the present invention to provide for such automated venting that will work in parallel with the existing manual vent mechanism.

Further objects, features, elements and advantages of the present invention will become readily apparent from the following detailed description of the preferred embodiment when considered with the attached drawings and the appended claims.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

Figure 1:
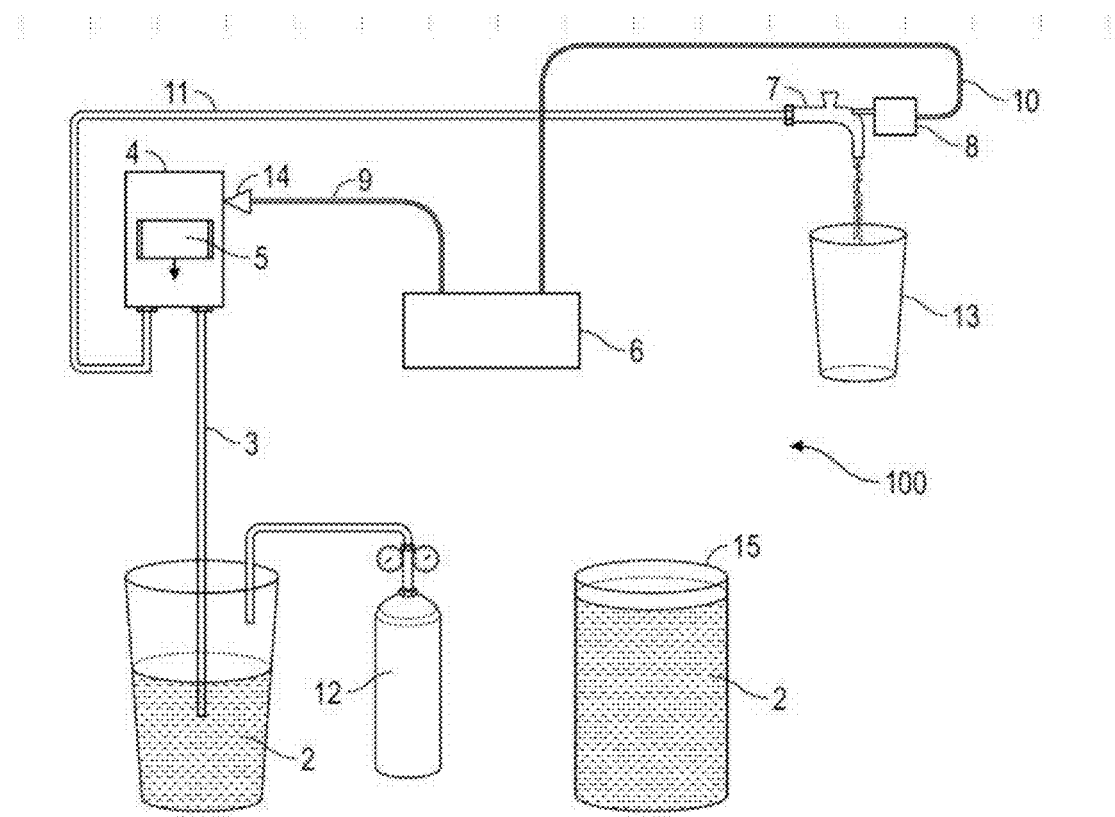
FIG. 1 is a schematic flow diagram of an improve beverage dispensing system having an automated touchless tap according to the Related Applications.

The best mode for carrying out the invention is presented in terms of its preferred embodiment, herein depicted within the Figures. It should be understood that the legal scope of the description is defined by the words of the claims set forth at the end of this patent and that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

The best mode for carrying out the invention is presented in terms of its preferred embodiment, herein depicted within the Figures.

1. Detailed Description of the Figures

Before explaining the present invention in detail, current systems for dispensing bulk keg beverages may be exemplified by present systems where beer is delivered from a cooler to a point of dispensing through a beer conduit such as an insulated bundle combining beer lines and coolant lines. In such systems, the beer is propelled by gas pressure applied over the beer in the keg. The keg is said to "kick" as it empties, when the level of the liquid beer falls below the discharge outlet in the keg. When this occurs, a frothy mixture of propellant gas and residual beer are blown out through the beer lines or hoses. When this happens, it causes at best an erratic, unsatisfactory, gassy pour of the residue that is difficult or impossible to control at the tap. To resume satisfactory dispensing of liquid beer, the lines must be repacked, refilled with beer and the gas displaced.

In order to attempt to minimize "keg kick", various designs of foam traps (also known as "foam trap", a "foam on beer" detectors or "FOBs"), are presently in commercial use to prevent the entrance of excessive foam into the distribution lines as the keg hits empty. While the placement of a FOB within a dispensing system is a feature that is advantageous with manually operated touchless taps, it is not a necessary feature. In contrast, with remotely controlled taps, such a feature is necessary. Indeed, without a FOB when a bartender sees foam being dispensed they can quickly close the tap. In the case of remotely controlled touchless taps, CO2 gas and foam will continue to blow through the tap for the duration of dispensing. Most FOB devices use a float to seal the outlet of a reservoir to which the beer lines are attached when the level of liquid in the reservoir falls low. While such systems may minimize the "kick" as the keg is emptied, it fails to address the problems caused for the first pours from the replacement kegs by lowered system pressures.

While the present invention addresses the inherent problems with cost, operation, sanitation, reliability or maintenance of such systems, it is important to understand that the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation.

Referring now to FIG. 1, wherein like reference numerals indicate the same parts throughout the several views, an empty keg detection system for carbonated beverages, generally noted as 100, is shown according to the Related Applications. The system 100 utilizes a bulk keg 1 containing a carbonated alcoholic beverage 2 that is pressurized by a pressurized tank of gas 12. A first delivery line 3 communicates the beverage 2 to a foam trap or FOB 4 which forms a reservoir or chamber into which the liquid is dispensed. The chamber contains a float 5 and further communicates the beverage through a second delivery line 11 to a touchless tap 7 which dispensed directly to a serving container 13.

The tap 7 contains a control valve. A system controller 6 communicates with and controls the valve 8 with a first communication cable 10. Further, the system controller 6 communicates with a level sensor 14 positioned along the FOB 4 with a second communication cable 9. It is preferred that the level sensor 14 be capable of non-binary level indication, i.e., more than a mere indication that the float moved up or down, but rather some indication as to the magnitude of such a level change.

As shown best in conjunction with FIG. 1, empty keg detection, which is the main component of the solution for controlling of dispensing of carbonated beverages, is based on the identifying the movement of the float 5 to the bottom of Foam On Beer (FOB) detector 4. Magnetic flux sensors placed strategically in a non-invasive and provide a non-binary representation of a location of the float. As soon as magnetic flux sensors attached to the FOB detect that the float started moving down, the controller 6 immediately sends a command to valve 8 built into the touchless tap 7 to close it. In order to prevent depressurization and excessive forming of a foam in the line 11 connecting the FOB 4 with the tap 7, the command to close the tap 7 is sent well before the float reaches the bottom of the FOB 4. Once it happened, the tap 7 is disabled until the controller 6 activates it again.

However, such a system 100 quite often reports false positive empty keg events, which results in closing the tap 7 and discontinuing the service even though there is sufficient volume of beverage in a keg 1. The reason for these false positive events is a gradual accumulation of a gas (typically $CO_2$ dissolved in a beverage) inside the chamber of the FOB 4. Excessive forming of foam can be caused by incorrect beverage temperature, pressure in the keg, or improper handling of a keg, such as dropping or rolling it. Once a command to close the valve controlling the tap is executed, the only way to bring this tap back in service is for a bartender or other staff members to go inside the cold room where beverage kegs are stored, find the FOB 4 controlling dispensing from this keg and vent (or bleed) the gas and foam out of the FOB 4 by pressing a pressure release button 20 that is typically located at the top of the FOB (manual vent mechanism). An example is shown in FIG. 2.

Figure 2:
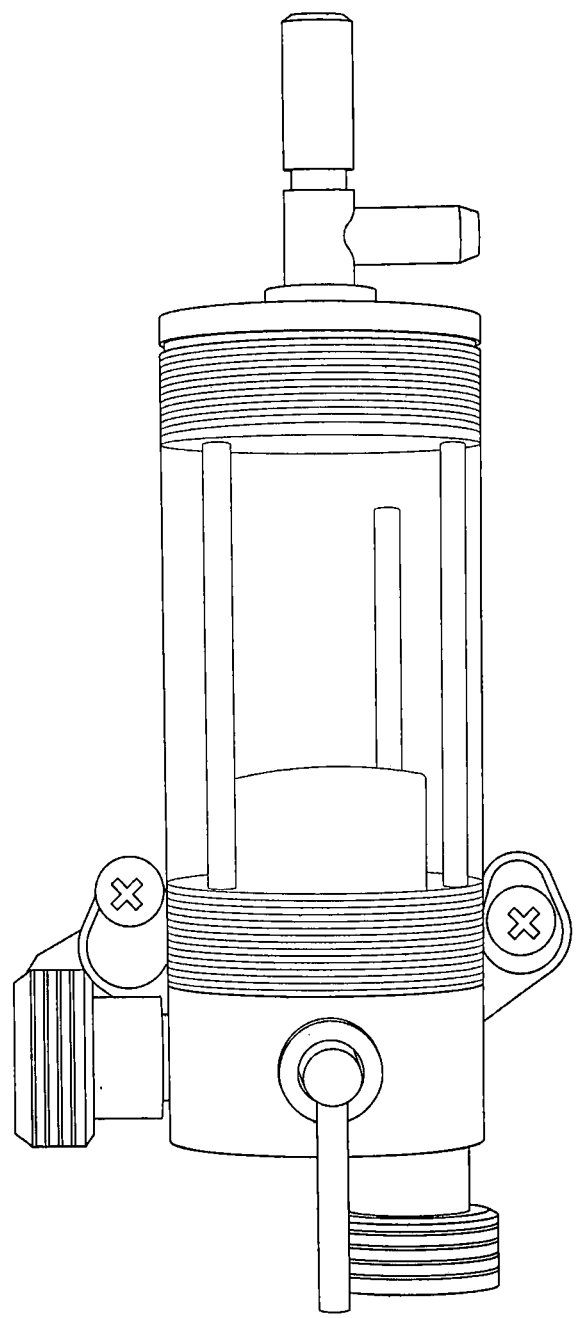
FIG. 2 is an example of a manual vent mechanism 20 for an FOB according to the PRIOR ART.

As shown in conjunction with FIG. 2, when the gas is vented out of the FOB the float moves up which is detected by the magnetic flux sensors and reported to the Controller to activate the tap. However, venting of FOB's is time consuming and, taking into the account that the temperature inside cold rooms is in mid-thirties, an unpleasant task. Depending on factors such as temperature of a beverage, pressure in a keg, and a condition of a beverage, accumulation of the gas inside the FOB might be significant, which results in frequent false empty keg events and necessitates frequent FOB venting.

Figure 3:
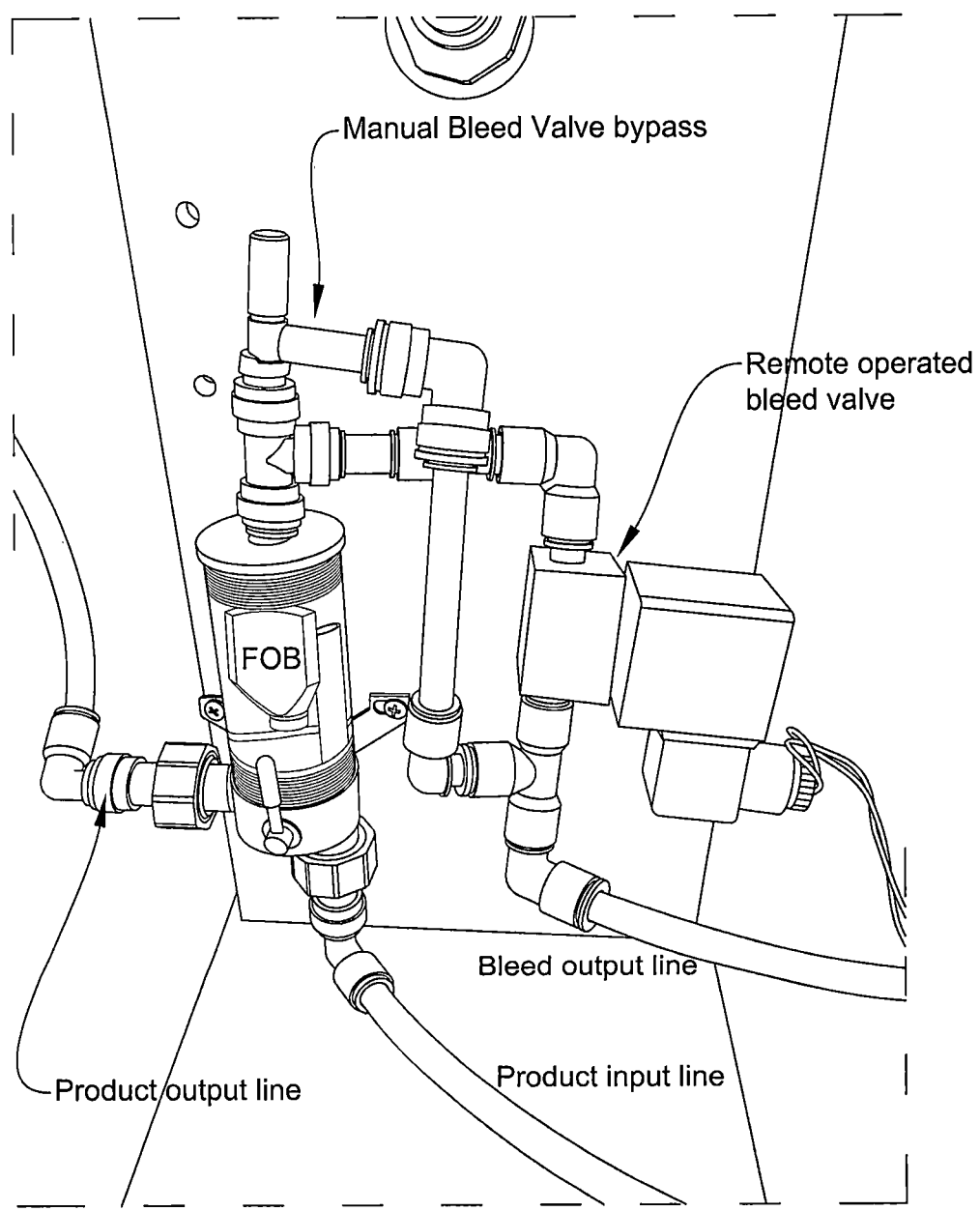
FIG. 3 is a photograph of an exemplary system for automated venting of gas/foam from a foam on beer detector for carbonated beverages according to the preferred embodiment of the present invention.
Figure 4:
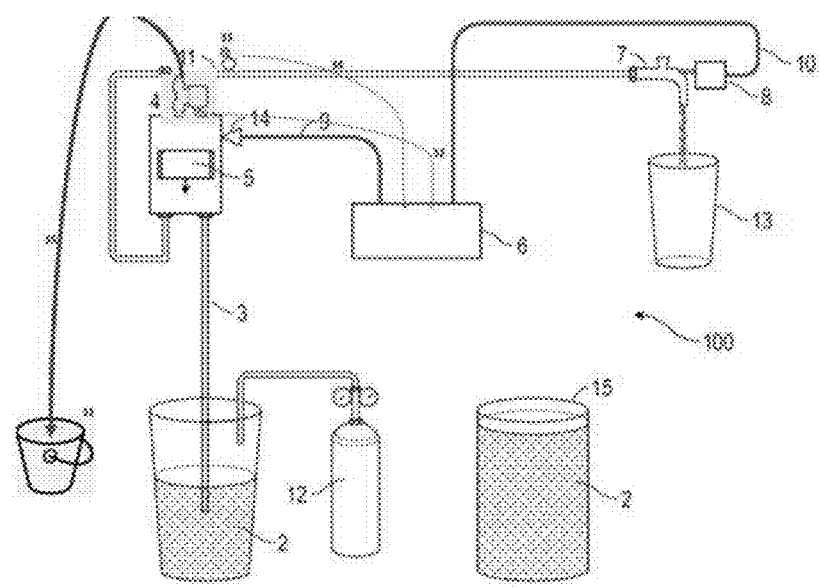
FIG. 4 is a schematic flow diagram of the system for automated venting of FIG. 3 according to the preferred embodiment of the present invention.

A solution to this problem is described in conjunction with FIG. 3 and FIG. 4, where the venting button 20 at the top of a FOB is temporarily removed and a remotely controlled vent (bleed) valve 30 is attached to the FOB. After that the venting button is reinstalled in parallel with the vent valve.

2. Operation of the Preferred Embodiment

In operation automated vent valve 30 can be implemented as a solenoid or pneumatic valve and is controlled by the controller 6 via connection 32. Tube 35 connects FOB-s vent outlet with a waste bucket 31. When FOB is vented a mix of gas, foam, and beverage is expelled from the FOB chamber and deposited in this waste bucket. It is still possible to continue venting FOB-s manually using manual bleed valve bypass by pressing the button on the top of the FOB.

Bypass valve for venting FOB-s can be opened by different mechanisms. These may include:
1. Manually by a bartender by pushing button 33 installed outside of a cold room close to a tap and connected to the Controller 6 via cable 34. It will be done when an empty keg condition is detected but a bartender is certain that the keg could not be empty.
2. By a bartender using a mobile phone app remotely connected to the Controller
3. In a fully automated mode. Once the Controller determines that an empty keg condition is detected, it first closes valve 7 controlling the tap, and then opens vent valve 30 to vent the FOB. This valve can be opened for a brief preprogrammed period of time sufficient to vent all gas and foam out of the FOB that would allow an activation of the tap.

The controller 6 can be programmed with different algorithms for managing an automated vent valve and supporting the following scenarios: FOB float drops down triggering discontinuation of the service. An automated vent valve is opened for a pre-programed period of time (a few seconds). If the FOB float does not raise to the top of the FOB, it can serve as a positive confirmation that an empty keg is detected and that appropriate alerts should be sent to the staff. The tap will continue to be disabled. If after the automated vent valve was activated FOB float continues to stay at the top of the FOB for the duration of several pours it can serve as a confirmation that a new full keg has been installed. Automated vent valve was activated and service resumed. If, however, after a few servings FOB float moves down again it can be an indication that a beverage is too foamy and cannot be served by the staff. The service is discontinued and appropriate alerts are sent to the staff. The previous algorithm can be enhanced to perform several cycles of FOB venting using an automated vent valve before making the final decision of discontinuing the service and sending alerts.

The foregoing descriptions of specific embodiments of the present invention are presented for purposes of illustration and description. The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but is to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by any adverse inference under the rulings of Warner-Jenkinson Company, v. Hilton Davis Chemical, 520 US 17 (1997) or Festo Corp. v. Shoketsu Kinzoku Kogyo Kabushiki Co., 535 U.S. 722 (2002), or other similar caselaw or subsequent precedent should not be made if any future claims are added or amended subsequent to this patent application.

We claim:

1. A system for dispensing carbonated beverages from a bulk keg comprising:
    a keg containing a carbonated alcoholic beverage that is pressurized by a pressurized tank of gas;
    a first delivery line for communicating the carbonated alcoholic beverage to a Foam on Beer (FOB) detector;
    said FOB detector forming a reservoir or chamber into which the liquid is dispensed and containing a float;
    a level detector in operative communication with said float and adapted to identify a level of said float;
    a remotely controlled vent or bleed valve attached to the FOB detector and in fluid communication with the reservoir or chamber and forming a vent outlet;
    a discharge conduit directing the vent outlet to a waste discharge; and
    a controller in operative communication with the level detector and the vent or bleed valve, said controller actuating the vent or bleed valve upon a low level detected by the level detector.

2. The system of claim 1, wherein said vent or bleed valve is selected from a group consisting of: solenoid valve; and a pneumatic valve.

3. The system of claim 1, further comprising:
    a manually actuated vent in fluid communication with the reservoir or chamber and forming a discharge to the vent outlet parallel with the remotely controlled vent or bleed valve.

4. The system of claim 2, further comprising:
    a manually actuated vent in fluid communication with the reservoir or chamber and forming a discharge to the vent outlet parallel with the remotely controlled vent or bleed valve.

5. The system of claim 1, wherein said Foam on Beer detector further forms a controller assembly further comprising:

a float chamber having a lower outlet opposite an upper inlet; the float chamber forming a housing with an internal volume sufficient to retain a float valve;

the float valve having a magnetic target and adapted for guided movement within the internal volume so as to react to the presence of foam within the housing;

a sensor control assembly supporting one or more sensors in coordination with the magnetic target such as to detect a position of the float and a movement of the float within the chamber.

6. The system of claim 5, wherein said sensors comprising magnetic flux sensors placed strategically in a non-invasive manner and providing a non-binary location of the float.

7. The system of claim 2, wherein said Foam on Beer detector further forms a controller assembly further comprising:

a float chamber having a lower outlet opposite an upper inlet; the float chamber forming a housing with an internal volume sufficient to retain a float valve;

the float valve having a magnetic target and adapted for guided movement within the internal volume so as to react to the presence of foam within the housing;

a sensor control assembly supporting one or more sensors in coordination of with the magnetic target such as to detect a position of the float and a movement of the float within the chamber.

8. The system of claim 7, wherein said sensors comprising magnetic flux sensors placed strategically in a non-invasive manner and providing a non-binary location of the float.

9. The system of claim 3 wherein said Foam on Beer detector further forms a controller assembly further comprising:

a float chamber having a lower inlet opposite an upper outlet and forming a housing and an internal volume sufficient to retain a float valve;

the float valve having a magnetic target and adapted for guided movement within the internal volume so as to react to the presence of foam within the housing;

a sensor control assembly supporting one or more sensors in coordination of with the magnetic target such as to detect a position of the float and a movement of the float within the chamber.

10. The system of claim 9, wherein said sensors comprising magnetic flux sensors placed strategically in a non-invasive manner and providing a non-binary location of the float.

11. The system of claim 4, wherein said Foam on Beer detector further forms a controller assembly further comprising:

a float chamber having a lower outlet opposite an upper inlet; the float chamber forming a housing with an internal volume sufficient to retain a float valve;

the float valve having a magnetic target and adapted for guided movement within the internal volume so as to react to the presence of foam within the housing;

a sensor control assembly supporting one or more sensors in coordination of with the magnetic target such as to detect a position of the float and a movement of the float within the chamber.

12. The system of claim 11, wherein said sensors comprising magnetic flux sensors placed strategically in a non-invasive manner and providing a non-binary location of the float.

* * * * *